(12) United States Patent
Hanai et al.

(10) Patent No.: US 7,879,278 B2
(45) Date of Patent: Feb. 1, 2011

(54) METHOD FOR FORMING PANEL UNITS HAVING IN SITU FORMED MOLDINGS

(75) Inventors: Naotaka Hanai, Obu (JP); Tomohiro Sakagami, Obu (JP); Toshiaki Kakuto, Obu (JP); Takanori Tanaka, Toyota (JP)

(73) Assignee: Tokai Kogyo Kabushiki Kaisha, Aichi-ken (JP)

( * ) Notice: Subject to any disclaimer, the term of this patent is extended or adjusted under 35 U.S.C. 154(b) by 1231 days.

(21) Appl. No.: 10/986,789

(22) Filed: Nov. 15, 2004

(65) Prior Publication Data

US 2005/0087907 A1 Apr. 28, 2005

Related U.S. Application Data

(62) Division of application No. 10/020,577, filed on Dec. 18, 2001, now abandoned.

(30) Foreign Application Priority Data

Dec. 18, 2000 (JP) ............................. 2000-384176

(51) Int. Cl.
*B29D 5/00* (2006.01)
(52) U.S. Cl. .................. 264/252; 264/142; 264/171.21; 264/145; 264/146; 264/147; 264/148; 264/149; 264/150; 264/151; 264/152; 264/153; 264/158; 264/160; 264/163; 264/118
(58) Field of Classification Search .............. 264/252, 264/3.3, 13, 464, 37.26, 37.32, 45.9, 638, 264/678, 514, 142, 171.21, 145–151, 152, 264/153, 158, 160, 163, 118
See application file for complete search history.

(56) References Cited

U.S. PATENT DOCUMENTS

| | | | | |
|---|---|---|---|---|
| 1,669,044 A | * | 5/1928 | Fraser | ......................... 428/438 |
| 4,781,957 A | * | 11/1988 | Brown et al. | ................... 428/43 |
| 5,411,696 A | | 5/1995 | Ito et al. | |
| 5,445,780 A | | 8/1995 | Yada et al. | |
| 5,498,391 A | * | 3/1996 | Ito et al. | ...................... 264/252 |
| 5,558,828 A | | 9/1996 | Yada et al. | |

FOREIGN PATENT DOCUMENTS

| | | | |
|---|---|---|---|
| JP | 58 110786 | | 7/1983 |
| JP | 58-110786 | * | 7/1983 |
| JP | 6 246792 | | 9/1994 |

* cited by examiner

*Primary Examiner*—Jeffrey Wollschlager
*Assistant Examiner*—Stella Yi
(74) *Attorney, Agent, or Firm*—Dennison, Schultz & MacDonald

(57) ABSTRACT

Methods for manufacturing panel units may include applying a cover tape to a surface of a panel in such a way as to substantially extend along a periphery of the panel. An extrusion molding die may be moved relative to the panel in such a way that the extrusion molding die moves along the periphery of the panel while at least partially contacting the cover tape applied to the panel. At the same time, a molten molding material may be extruded from the extrusion molding die, thereby integrally forming a molded article on the periphery of the panel. The cover tape may be then removed from the surface of the panel in order to produce a panel unit having the molded article disposed along the periphery of the panel.

8 Claims, 12 Drawing Sheets

US 7,879,278 B2

METHOD FOR FORMING PANEL UNITS HAVING IN SITU FORMED MOLDINGS

This application is a division of Ser. No. 10/020,577 filed Dec. 18, 2001 now abandoned.

BACKGROUND OF THE INVENTION

1. Field of the Invention

The present invention relates to methods for manufacturing panels having molded articles (moldings) disposed thereon (hereinafter "a panel unit") and to panel units produced by such methods.

2. Description of the Related Art

A panel unit typically comprises a resin, glass or metal panel, and a frame-like or linear resin molded article that is attached to the periphery of the panel. Examples of such panels include resin window panes and glass window panes for vehicles and examples of molded articles include moldings (e.g., a weather strip), gaskets and static seals. Such panel units have been manufactured by extrusion molding a resin molded article directly onto the periphery of the panel and simultaneously bonding the molded article thereto. In such a method for manufacturing a panel unit, an extrusion molding die is moved relative to the periphery of the panel while at least partially contacting at least one of the upper or lower surfaces of the panel.

SUMMARY OF THE INVENTION

When the extrusion molding die and the panel are moved relative to each other, frictional forces can be produced between the panel surface(s) and sliding-contact surface(s) of the extrusion molding die. Such frictional forces may cause damage to the panel especially if the panel is a resin panel or a laminated soft glass panel. Further, the frictional forces may cause wear of the extrusion molding die, especially if the panel is made from a tempered glass and the extrusion molding die is made from a relatively soft material, e.g., an aluminum alloy.

It is, accordingly, one object of the present teachings to provide improved methods for manufacturing panel units.

In one embodiment of the present teachings, methods are taught for manufacturing a panel unit having a panel and a molded article disposed on a periphery of the panel. For example, a cover tape may be applied to a surface of the panel and is preferably disposed so as to substantially extend along a periphery of the panel. The cover tape preferably has a width of about 1-5 centimeters. Then, an extrusion molding die having an opening may be moved relative to the panel (or vice versa) so that the extrusion molding die moves along the periphery of the panel. Preferably, the extrusion molding die at least partially contacts the cover tape disposed along the periphery of the panel, but does not directly contact the panel. While moving the extrusion molding die relative to the panel (or vice versa), a molten or substantially liquid molding material is extruded from the opening of the extrusion molding die, thereby integrally forming a molded article on the periphery of the panel. Preferably, the molded article is disposed substantially adjacent to the cover tape. Finally, the cover tape may be removed from the surface of the panel in order to produce a panel unit that includes the panel and the molded article.

Thus, methods according to the present teachings enable panel units to be manufactured without damaging the panel or causing excessive wear to the extrusion molding die.

In another aspect of the present teachings, panel units are taught that may be formed by the methods taught herein. For example, a panel unit may include a panel, such as a glass window, a resin window or a metal plate. An in situ formed molding is preferably disposed along at least one peripheral edge of the panel. Because the molding is formed in situ by directly forming the molding onto the panel, no gaps or air pockets will exist between the molding and the panel. Further, the molding will precisely follow the contour of the panel and always have a uniform outer dimension, even if the panel differs from an ideal size. More preferably, a cover tape is disposed on at least one surface of the panel adjacent to the molding. Optionally, an adhesive layer may be disposed between the panel and the molding. In addition, the adhesive layer may partially or completely overlap the cover tape.

Other objects, features and advantage of the present invention will be readily understood after reading the following detailed description together with the accompanying drawings and the claims.

DETAILED DESCRIPTION OF THE INVENTION

Figure 1:
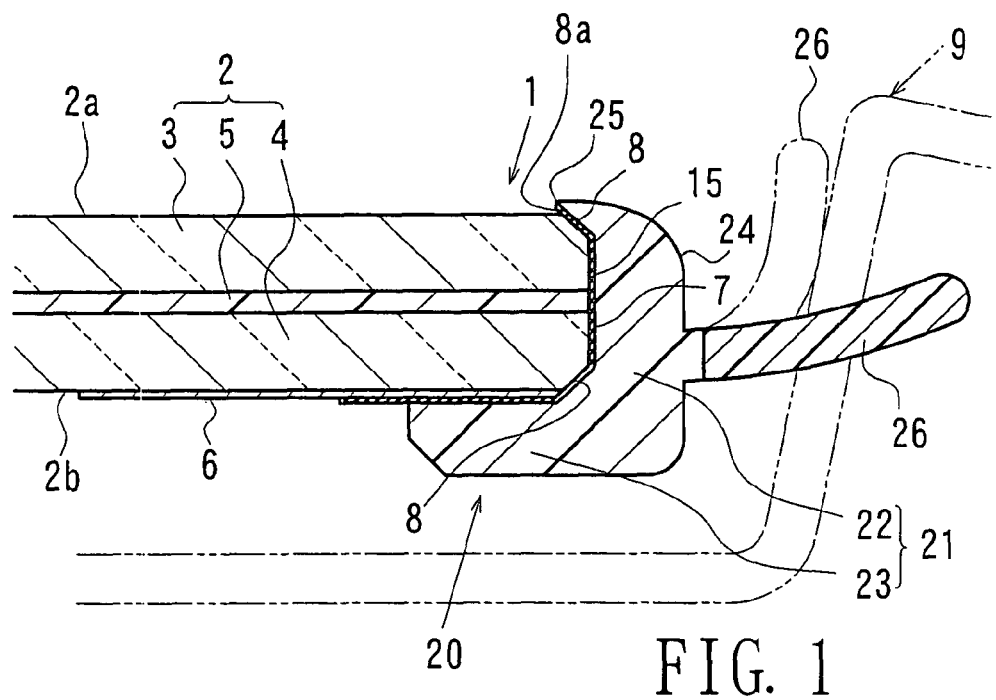
FIG. 1 is a partial cross-sectional view of a windshield unit mounted on a vehicle body, which corresponds to a first embodiment of the present teachings, and corresponds to a sectional view taken along line I-I of FIG. 2.

Representative methods for manufacturing panel units and the resulting panels are taught herein. For example, such methods may be utilized to form a panel unit having a panel and an in situ formed molded article or molding.

In one embodiment of the present teachings, a cover tape may be applied to a surface (e.g., the outer surface) of a panel and arranged so as to substantially extend along a periphery of the panel. Thereafter, an extrusion molding die can be moved relative to the panel in such a way that the extrusion molding die moves along the periphery of the panel while partially contacting the cover tape applied to the panel. At the same time, a molten (or substantially liquid) molding material may be extruded from the extrusion molding die, thereby integrally forming a molded article or molding on the periphery of the panel. Optionally, the cover tape may thereafter be removed from the surface of the panel.

The present methods are not limited to any particular use or application. However, the present methods may advantageously be utilized to manufacturing a windshield unit having a vehicle windshield and a molding disposed along a peripheral edge of the vehicle windshield.

In another embodiment of the present teachings, an adhesive or adhesive layer may optionally be applied to the periphery of the panel before the molten molding material is extruded. The adhesive or adhesive layer may help to ensure that the molding or molded article reliably bonds to the periphery of the panel.

In another embodiment of the present teachings, the molded article may be formed so as to only cover an opposite surface (inner) and an end surface of the panel. Preferably, the formed molded article or molding may have a peripheral edge that aligns with a peripheral edge of the panel surface. Optionally, the cover tape may be cut or trimmed along the peripheral edge of the panel surface after the cover tape is attached to the panel surface. This cutting or trimming of the cover tape will ensure that a peripheral edge of the cover tape is aligned with the peripheral edge of the panel surface.

In an additional representative example of the present teachings, the cover tape may be partially cutting away along the periphery of the panel, to thereby form a desired width of uncovered panel surface portion that extends along the periphery of the panel. In this case, the molded article may have a portion (extension) that may cover the surface of the panel. For example, the cover tape may be cut in such a way so as to provide a cutting surface that is inclined at an acute angle to the panel surface. Further, the extension may have an end surface that is inclined at an obtuse angle to the panel surface.

In another embodiment of the present teachings, the molded article can be substantially formed in such a way as to provide a part (covering portion) that may cover the cover tape that was previously attached to the surface of the panel. In this case, the covering portion and the cover tape may be cut along the periphery of the panel. As a result, the formed molded article may have a desired width of extension that partially covers the panel surface when the cover tape is removed from the panel surface. In this embodiment, a portion of the cover tape may be left on the panel and may be interleaved between the extension and the panel surface. Preferably, the covering portion and the cover tape are cut in such a way that the extension provides a cutting surface that is inclined at an obtuse angle to the panel surface. Optionally, the cover tape may be cut or trimmed along the peripheral edge of the panel surface after the cover tape is attached to the panel surface.

Additional representative examples of the present teachings will be described in further detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the above detail description may not be necessary to practice the invention in the broadest sense, and are instead taught merely to particularly describe some representative examples of the invention. In addition, the present teachings naturally may be combined in ways that are not specifically enumerated in order to provide additional useful embodiments of the present teachings.

Three detailed representative embodiments of the present teachings are shown in FIGS. 1 to 24, in which a windshield and a molding for a vehicle are described as representative examples of a panel and a molded article, respectively. That is, in these embodiments, a windshield unit that comprises a windshield and a molding is described as a representative panel unit according to the present teachings.

First Detailed Representative Embodiment

The first detailed representative embodiment will now described with reference to FIGS. 1 to 13. As shown in FIG. 1, a windshield (panel) unit 1 may include a windshield 2 and a molding (molded article) 20. The windshield 2 may be a substantially rectangular-shaped, laminated glass that is constructed from two glass plates 3, 4 and a joining resin sheet 5 (e.g., a polyvinyl butyral sheet) that is interleaved therebetween. The windshield 2 has a first surface 2a that is exposed to the exterior of the vehicle and a second surface 2b that faces the vehicle interior (cabin) when the windshield unit 1 is mounted on a window frame 9 of a vehicle body. Further, a peripheral edge of the second surface 2b of the windshield 2 may be coated with a substantially opaque (e.g., opaque black) ceramic layer 6, which layer has a suitable width and extends circumferentially along the periphery of the windshield 2.

In addition, the windshield 2 may be circumferentially chamfered along its periphery, so as to form opposed inner and outer chamfered portions 8. Because glass plates 3, 4 are typically made from non-treated or normal glass, as opposed to tempered glass, the windshield 2 may be easily scratched or flawed, because the normal glass has a lesser hardness than tempered glass.

Figure 2:
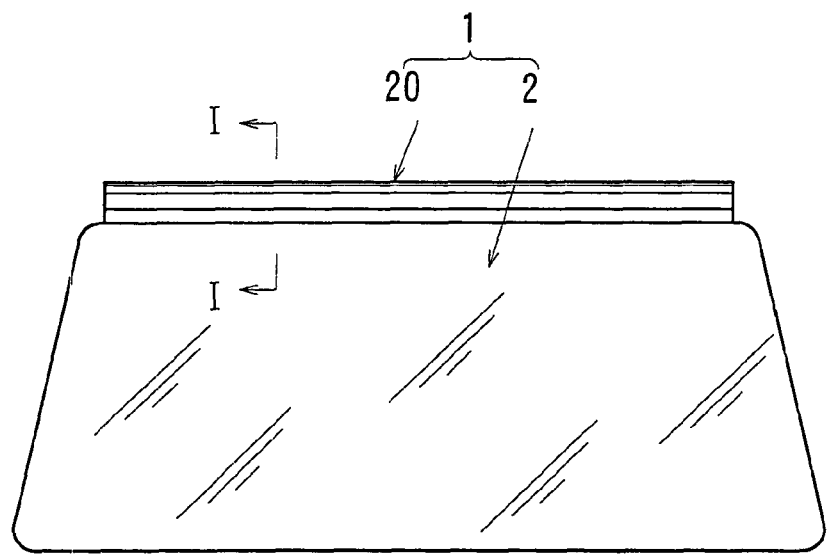
FIG. 2 is an elevational view of the windshield unit.
Figure 3:
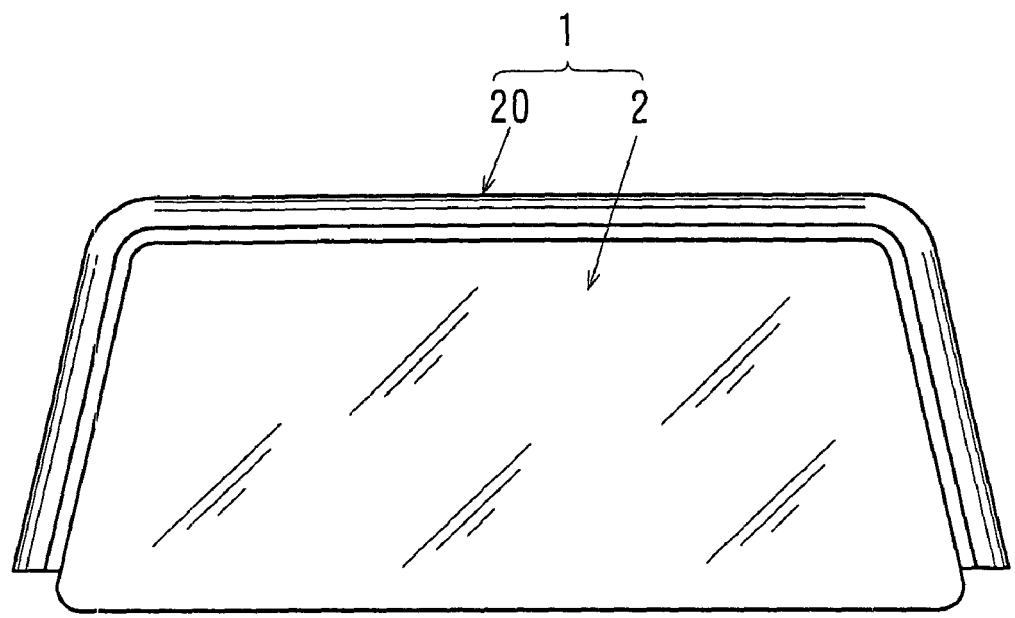
FIG. 3 is an elevational view similar to FIG. 2, illustrating an extended form of the molding.

The molding 20 may be extrusion molded onto the periphery of the windshield 2, so as to cover the end surface 7 and the second surface 2b of the windshield 2. The molding 20 may optionally bond or adhere to the periphery of the windshield 2 via an adhesive layer 15, which can be applied to the windshield 2 before extrusion molding the molding 20. The molding 20 may preferably extend along portions of the periphery of windshield that are required for suitably mounting the windshield 2 within the window frame 9. For example, as shown in FIG. 2, the molding 20 may extend along only the upper portion of the windshield periphery. Further, as shown in FIG. 3, the molding 20 may extend along the upper portion and both side portions of the windshield periphery. Moreover, as shown in FIG. 4, the molding 20 may extend along the upper portion, both side portions and the lower portion of the windshield periphery.

Figure 4:
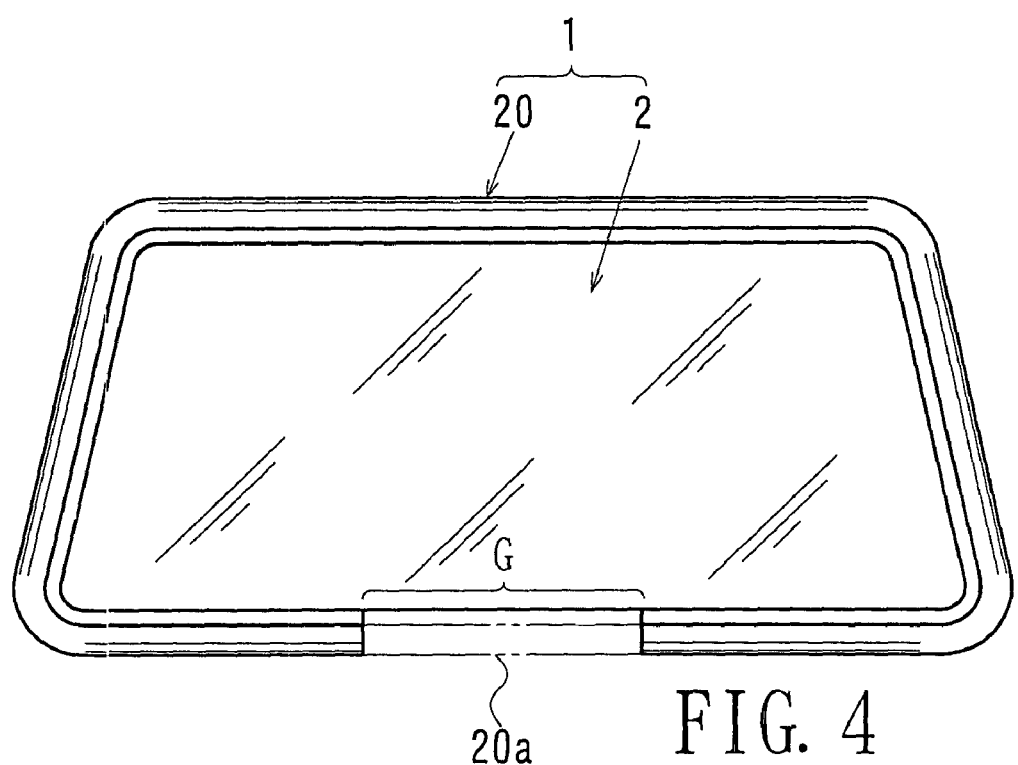
FIG. 4 is an elevational view similar to FIG. 2, illustrating a further extended form of the molding.

Because it is technically difficult to form a molding that completely encircles the peripheral edges of the windshield 2 using extrusion molding techniques, as shown in FIG. 4, the molding 20 may include a gap G. If a complete molding is required, as shown by a broken line in FIG. 4, a spacer molding 20a may be inserted into the gap G of the molding 20. The spacer molding 20a may be, e.g., a separately formed molding produced by an extrusion molding technique or an injection molded spacer molding. If injection molding is utilized, the spacer molding 20a may be formed either separately from the windshield 2 and then mounted within the gap G using an adhesive or may be directly injection molded onto the windshield 2.

Referring back to FIG. 1, the molding 20 preferably is a single, continuous, elongated piece that includes a molding body 21 comprising a thermoplastic elastomer, a thermoplastic synthetic resin and/or a synthetic rubber. A sealing lip 26 preferably extends from the molding body and also comprises an elastomer. However, the elastomer of the sealing lip 26 is preferably more elastic than the elastomer of the molding body 21. For example, the molding body 21 may preferably comprise hard or semi-hard polyvinyl chloride resins (PVC) and/or polyolefin resins. Further, the sealing lip 26 may preferably comprise soft PVC and/or chlorinated ethylene copolymer resins.

Figure 13:
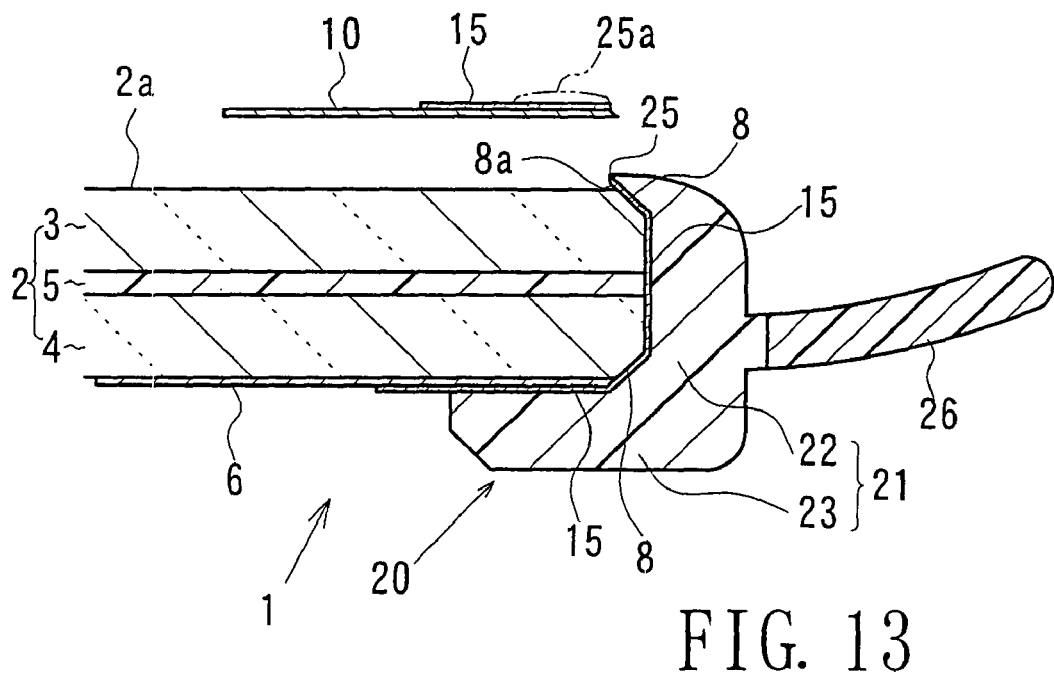
FIG. 13 is a partial cross-sectional view of the windshield unit that is formed by removing the cover tape.

As shown in FIGS. 1 and 13, the molding body 21 preferably has a substantially L-shaped configuration in cross section. Further, the molding body 21 may include a side wall portion 22, which has a shape that substantially conforms to the end surface 7 of the windshield 2, and which is bonded to the end surface 7 of the windshield 2 via the adhesive layer 15. In addition, the molding body 21 may include an inner wall portion 23, which has a shape that substantially conforms to the second surface 2b of the windshield 2, and which is bonded to the second surface 2b of the windshield 2 via the adhesive layer 15. The side wall portion 22 may have a rounded, outer ornamental surface 24 that has a downwardly slanted, substantially quadrant shape in cross section, in order to impart an attractive appearance to the molding 20. Also, the side wall portion 22 preferably includes a peripheral edge 25 that substantially aligns with an outer peripheral edge 8a of the outer chamfered portion 8.

As shown in FIG. 1, the sealing lip 26 has a curved or rounded profile that outwardly extends from the side wall portion 22 of the molding body 21. The sealing lip 26 is adapted to flex when the windshield unit 1 is mounted within the window frame 9 of the vehicle body, so as to seal the space between the windshield 2 and the window frame 9.

A representative method for manufacturing windshield unit 1 according to the first representative embodiment will now be described. For example, the rectangular windshield 2 is optionally constructed from two glass plates 3, 4 having a joining resin sheet 5 disposed between the two glass plates 3, 4. A substantially opaque frit layer 6 optionally may be coated onto the second surface 2b of the windshield 2. More preferably, the frit layer 6 has a width of several centimeters along the periphery of the windshield 2. The windshield 2 also may be circumferentially chamfered along its periphery, so as to form the chamfered portions 8.

Figure 7:
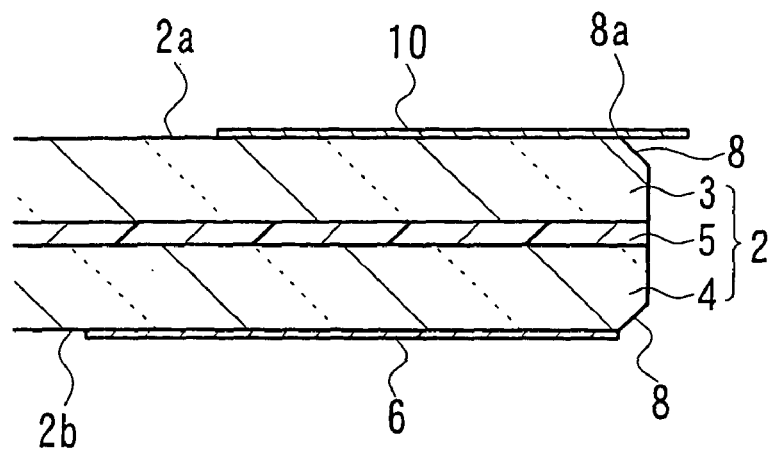
FIG. 7 is a partial cross-sectional view of a cover tape applied to the windshield before an unnecessary portion of the cover tape is cut away.

As shown in FIG. 7, a protective tape or cover tape 10 having a suitable width (e.g., several centimeters) is preferably applied to the first surface 2a of the windshield 2, so as to extend circumferentially along the periphery of the windshield 2. Preferably, the cover tape 10 is arranged on the windshield first surface 2a so that its longitudinal edge projects over the outer chamfered portion 8 of the windshield 2. Optionally, the cover tape 10 may be applied to only a portion of the upper, side and lower portions of the windshield periphery, as will be understood after reading the following description.

Typically, the cover tape 10 is manually applied to the first surface 2a of the windshield 2. However, it is possible to apply the cover tape 10 to the windshield first surface 2a by utilizing an automated machine. Further, a preferred material for the cover tape 10 is MT-3155, which is supplied by Nitto Denko Kabushiki Kaisha of Japan.

Figure 8:
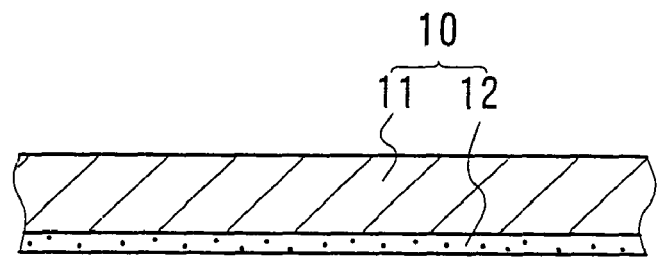
FIG. 8 is an enlarged, partial cross-sectional view of the cover tape.

As shown in FIG. 8, the cover tape 10 may optionally include a substrate layer 11 and an adhesive layer 12. Preferably, the cover tape has a thickness of about 0.03 to 0.1 mm. The substrate layer 11 may comprise a synthetic resin sheet that has excellent heat resistance (e.g., which is sufficient to prevent the sheet from melting when the heated extrusion molding die contacts it), flex resistance and solidity, and may be for example, a sheet of PET (polyethylene terephthalate). The adhesive layer 12 may comprise a removable self-adhesive material that will permit the cover tape 10 to be easily removed from the windshield 2 after the molding 20 has been formed on the windshield 2.

Figure 9:
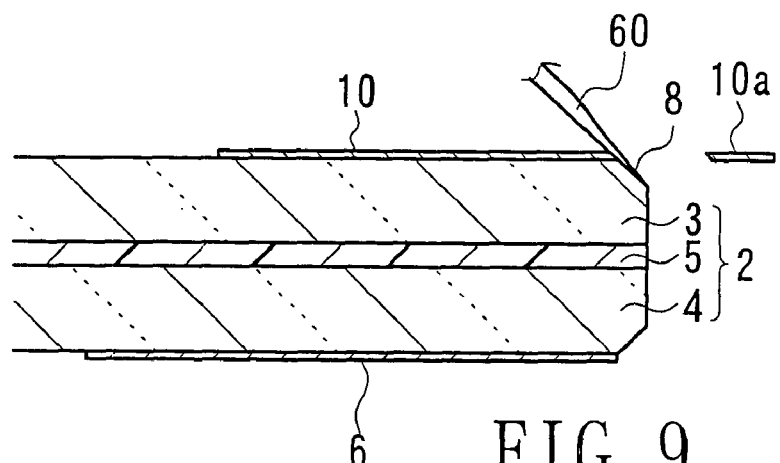
FIG. 9 is a partial cross-sectional view of the cover tape applied to the windshield and illustrating an unnecessary portion of the cover tape being cut away.

After suitably applying the cover tape 10 to the windshield 2, the cover tape 10 may be trimmed or cut along the peripheral edge 8a of the outer chamfered portion 8, in order to remove an unnecessary portion 10a. As shown in FIG. 9, a trimmer or cutter blade 60 that is aligned with the surface of the chamfered portion 8 may obliquely cut the cover tape 10. Therefore, the cutting surface (cut edge) of the cover tape 10 will be substantially coplanar with the surface of the chamfered portion 8.

Figure 10:
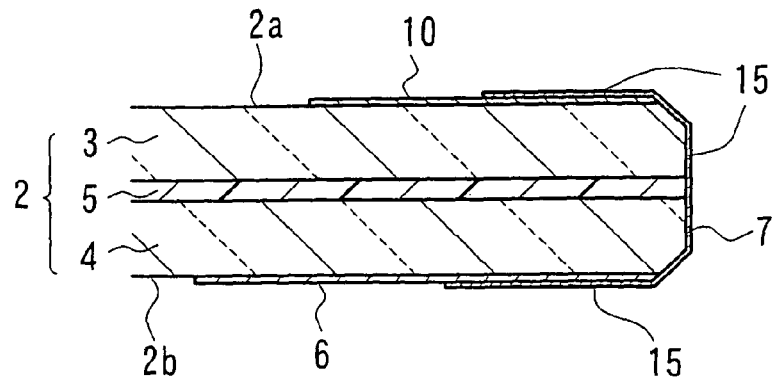
FIG. 10 is a partial cross-sectional view of the windshield shown in FIG. 9 after the unnecessary portion of the tape has been removed and an adhesive layer has been applied thereto.

Subsequently, as shown in FIG. 10, the adhesive layer 15 may be applied to the periphery of the windshield 2, so as to cover a portion of the cover tape 10 on the windshield first surface 2a In addition, the adhesive layer 15 may also cover the end surface 7 and a portion of the frit layer 6 that is disposed on the second surface 2b of the windshield 2. For example, the adhesive layer 15 may be preferably applied to the frit layer 6 and the cover tape 10 so as not to extend past the frit layer 6 and the cover tape 10.

The adhesive layer 15 may preferably comprise an adhesive material that can reliably bond the molding 20 to the windshield 2. For example, heat reactive adhesives, e.g., modified nylon (modified polyamide) based adhesives, are preferred in the present teachings. A preferred material for the heat reactive adhesives is TA-10S (Improved Version), which is supplied by Toa Gosei Kabushiki Kaisha of Japan.

Figure 6:
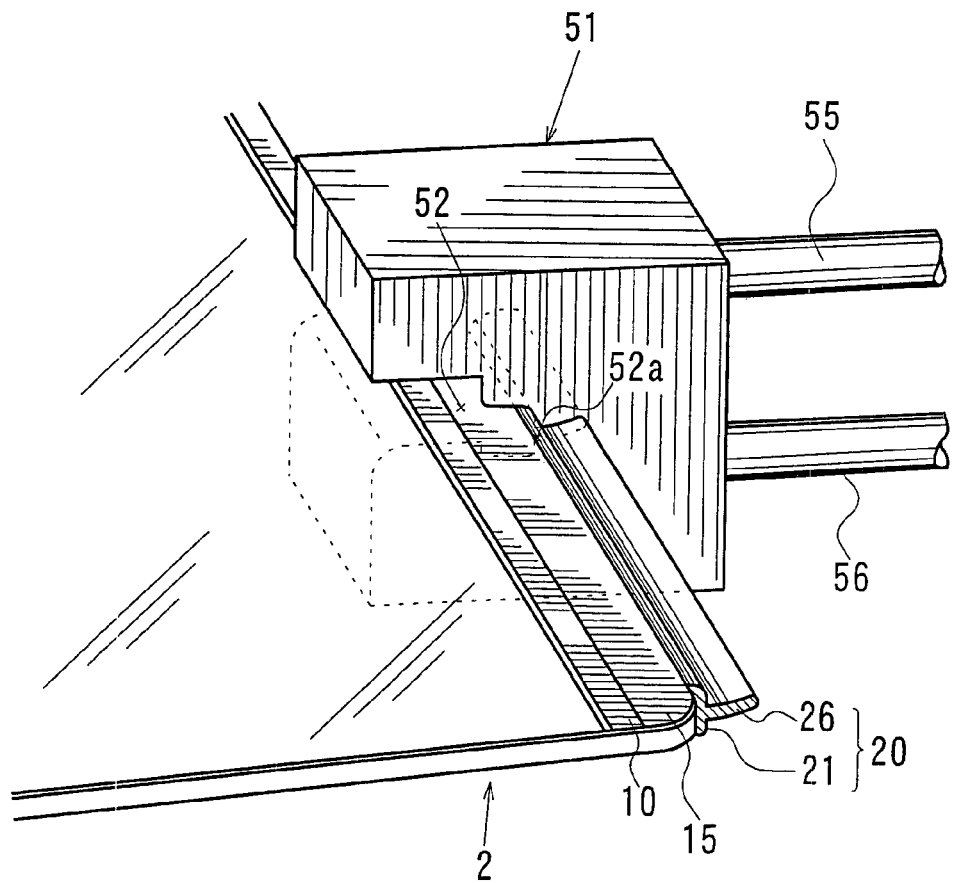
FIG. 6 is a perspective view of an extrusion molding die during formation of the molding on the periphery of a windshield.
Figure 11:
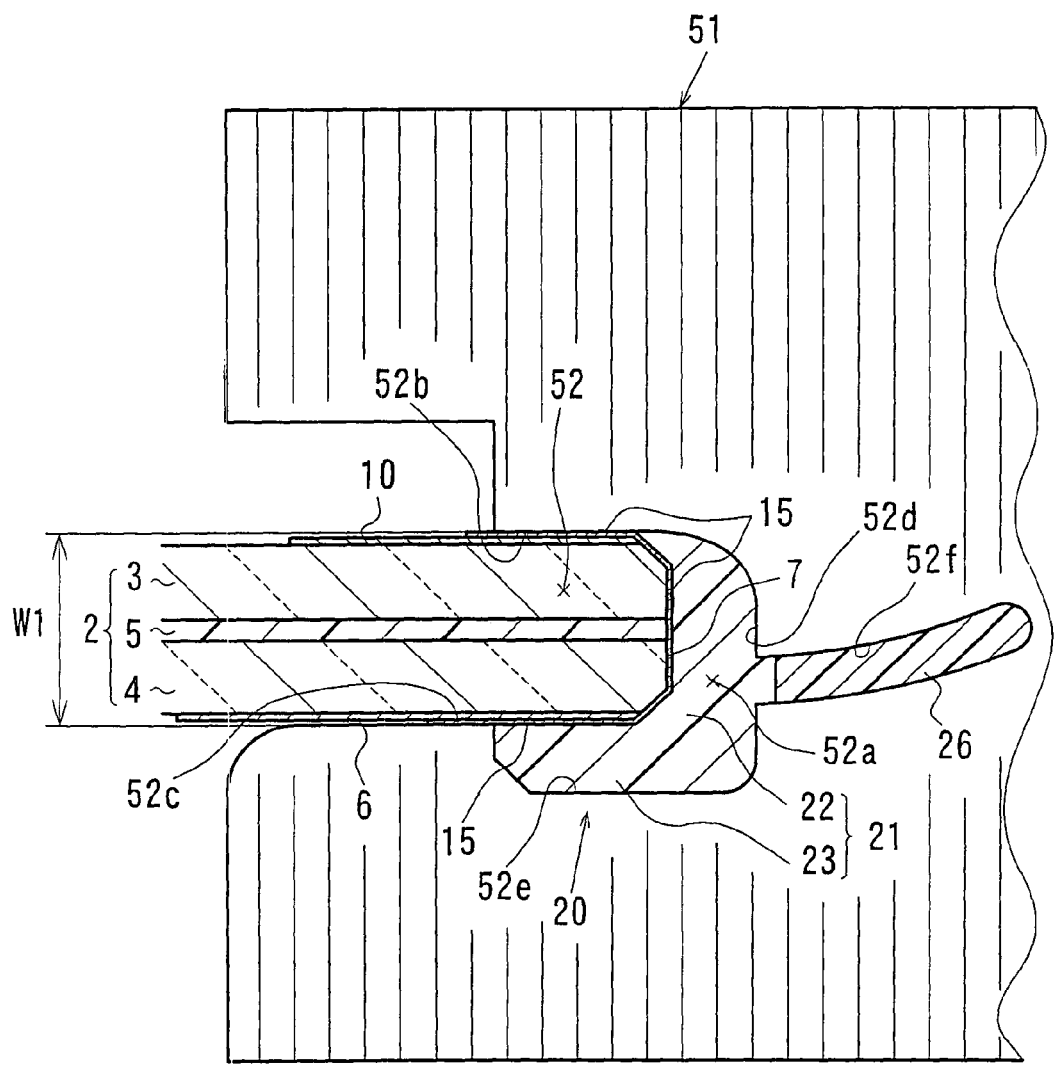
FIG. 11 is a cross-sectional view of an extrusion molding die during formation of the molding on the periphery of the windshield.

Referring to FIGS. 6 and 11, an extrusion molding apparatus is preferably utilized to form the molding 20 on the windshield 2. A representative extrusion molding apparatus may include an extrusion molding die 51 that is capable of extrusion molding the molding 20 and is adapted to move along the periphery of the windshield 2. The extrusion molding die 51 may include a slot-shaped groove 52 that is designed to receive the peripheral edge of the windshield 2. More preferably, the groove 52 may slidably and substantially sealingly receive the peripheral edge of the windshield 2. As best shown in FIG. 11, the groove 52 preferably defines a molding space 52a that will be formed around the periphery of the windshield 2 when the windshield 2 is inserted into or engaged with the groove 52. Naturally, the cross-section of the molding space 52a will correspond to the cross section of the resulting molding 20 that is molded onto the windshield 2.

The groove 52 preferably includes an upper or first contacting surface 52b and a lower or second contacting surface 52c. The groove 52 has a width W1, which is the distance between the first contacting surface 52b and the second contacting surface 52c. Width W1 is chosen so as to slidably and substantially sealingly receive the windshield 2. When the windshield 2 is inserted into groove 52, the first contacting surface 52b will face the cover tape 10 and adhesive layer 15 that are attached to the windshield first surface 2a. On the other hand, the second contacting surface 52c will face the frit layer 6 and the adhesive layer 15 that have been applied to the windshield second surface 2b.

Groove 52 may also include a first molding surface 52d that is defined to form the molding body side wall portion 22, an enlarged second molding surface 52e that is defined to form the molding body inner wall portion 23, and an elongated third molding surface 52f that is defined to form the sealing lip 26. Moreover, width W1 of groove 52 is preferably chosen to be slightly larger than the thickness of the windshield 2, including the thickness of the cover tape 10 and the frit layer 6 that are fusion and/or chemically bonded to the windshield 2.

Figure 5:
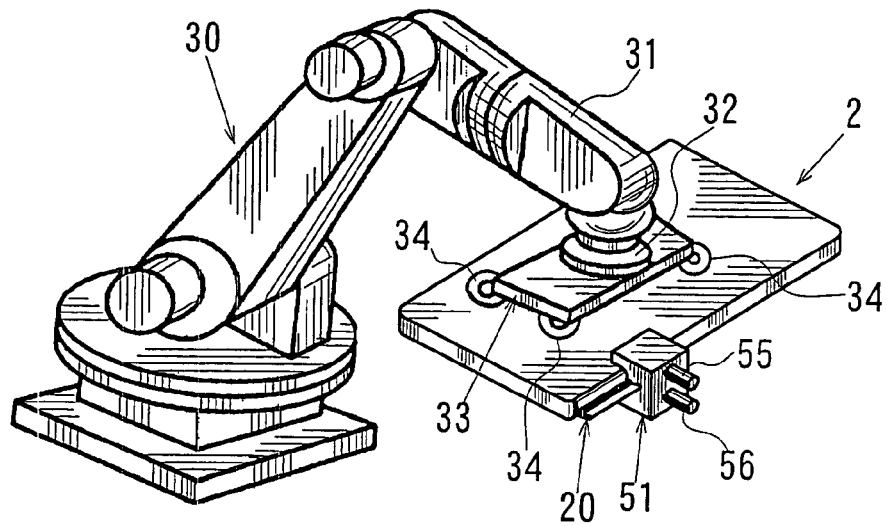
FIG. 5 is a perspective view of a representative apparatus that can be used to manufacture the windshield unit of FIG. 1.

The extrusion molding die 51 optionally may include first and second molding material feeder passages (not shown) that communicate with the molding space 52a and are coupled to the first and second feeder pipes 55, 56, respectively, which are shown in FIGS. 5 and 6. The feeder pipes 55, 56 may be coupled to first and second extruders (not shown), respectively, so that first and second molding materials extruded by the first and second extruders are supplied to the feeder pipes 55, 56. For example, the first and second feeder passages may be utilized to supply two different extrusion materials to the extrusion molding die 51, so that the molding body 21 and the sealing lip 26 can be formed from different materials.

As shown in FIG. 5, a representative molding apparatus may optionally include a robot 30 for handling the windshield 2. A six-axes type robot 30 preferably may be used that includes a panel retainer unit 33 mounted on a retainer portion 32 that is provided on the distal end of a support arm 31. The panel retainer unit 33 has a suitable number of suction disks 34 (e.g., 4) that may releasably retain the windshield 2. The suction disks 34 may be coupled to a vacuum source (not shown). Upon energization of the vacuum source, the suction disks 34 stick to the windshield 2 so that the windshield 2 is retained on the panel retainer unit 33.

A representative method for manufacturing the windshield unit 1 using the representative robot 30 shown in FIG. 5 will now be described. First, the vacuum source may be coupled to the robot 30 and energized. Then, the robot 30 may be driven so as to retain the windshield 2 on the panel retainer unit 33. The robot 30 may then be further driven to move the panel retainer unit 33 retaining the windshield 2 so that the peripheral edge of the windshield 2 engages the groove 52 of the extrusion molding die 51, as shown in FIGS. 5, 6 and 11.

When the extrusion molding die 51 is thus positioned with respect to the peripheral edge of the windshield 2, the groove 52 cooperates with the periphery of the windshield 2 to form the molding space 52a around the periphery of the windshield 2. Further, as shown in FIG. 11, the first contacting surface 52b of the groove 52 will contact the cover tape 10 (and the adhesive layer 15) on the windshield 2. However, the first contacting surface 52b will not directly contact the outer surface 2a of the windshield 2.

Thereafter, the robot 30 may be driven according to a predetermined operational program in order to continuously move the windshield 2 with respect to the extrusion molding die 51. Preferably, the windshield 2 moves relative to the extrusion molding die 51, such that the first contacting surface 52b of the groove 52 contacts the cover tape 10 on the windshield 2. Simultaneously, the first extruder (not shown) is actuated, thereby feeding the first liquid or molten molding material (e.g., molten PVC) for the molding body 21 into the first feeder passage (not shown) of the extrusion molding die 51 through the first feeder pipe 55. Also, the second extruder (not shown) is actuated, thereby feeding the second liquid or molten molding material (e.g., molten chlorinated ethylene copolymer resins) for the sealing lip 26 into the second feeder passage (not shown) of the extrusion molding die 51 through the second feeder pipe 56.

These molten molding materials are simultaneously forced into the molding space 52a defined around the periphery of the windshield 2. Preferably, the first and second extruders are preferably controlled in response to the operational program of the robot 30 so that the required amounts of the first and second molding materials are extruded from the first and second feeder passages, respectively. Thus, the molding 20 is formed to include molding body 21 and sealing lip 26 and the molding 20 is continuously formed on and bonded to the periphery of the windshield 2. Naturally, the adhesive layer 15 is disposed between the windshield 2 and the molding 20.

Figure 12:
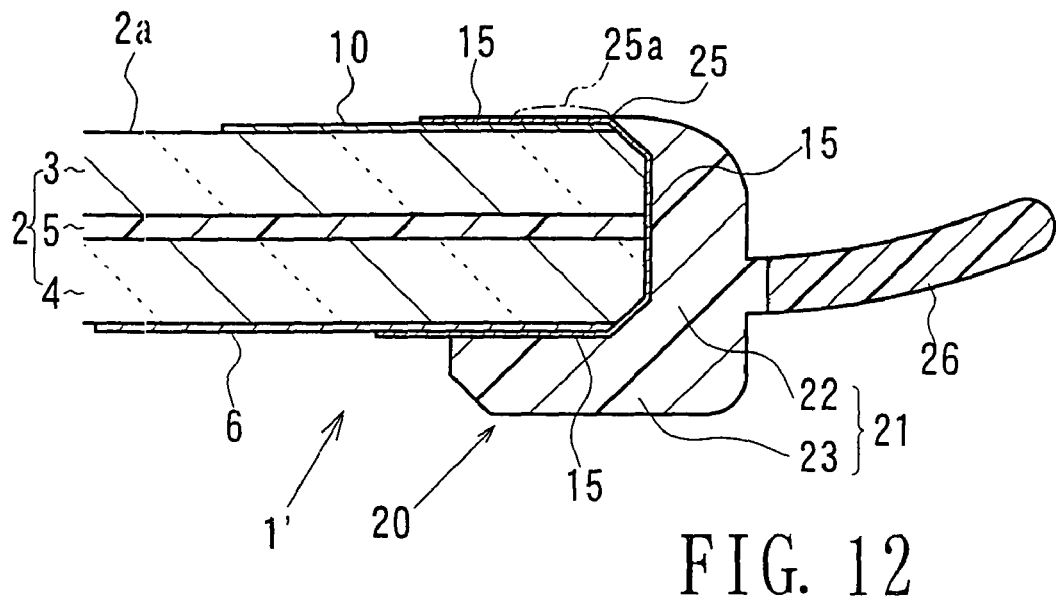
FIG. 12 is a partial cross-sectional view of an intermediate windshield unit in which the cover tape has not yet been removed.

Consequently, the intermediate windshield unit 1' shown in FIG. 12 can be formed according to this representative technique. In the intermediate windshield unit 1', the peripheral edge 25 of the molding side wall portion 22 substantially corresponds to the cutting surface of the cover tape 10.

In the representative methods described above, the windshield 2 may be preferably preheated to about 60-120° C. Then, the molding materials at a temperature of about 150-200° C. may be extruded onto the peripheral edge of the windshield. By preheating the windshield 2, it is possible to prevent early or rapid solidification of the extruded molding materials that may result in inferior performance of the formed molding 20. Also, if the windshield 2 is preheated, the extruded molding materials are substantially uniformly solidified. Thus, problems caused by non-uniform solidification of the extruded molding materials can be avoided. In addition, if the windshield 2 is preheated, the extruded molding materials will not lose its fluidity. As a result, problems caused by reduced fluidity of the extruded molding materials can be avoided. Moreover, the preheating of the windshield 2 may reduce any possible temperature difference between the windshield 2 and the extruded molding material. Therefore, problems (e.g., thermal shock problems of the windshield 2) caused by such a temperature difference can be effectively eliminated.

Referring to FIG. 13, the cover tape 10 may then be removed from the windshield 2 of the intermediate windshield unit 1', thereby forming the windshield unit 1. In the windshield unit 1 thus formed, the peripheral edge 25 of the molding side wall portion 22 is substantially aligned with the peripheral edge 8a of the outer chamfered portion 8. In other words, the peripheral edge 25 terminates at a peripheral edge of the windshield first surface 2a, because the peripheral edge 8a of the outer chamfered portion 8 corresponds to the peripheral edge of the windshield first surface 2a.

When the robot 30 moves the windshield 2 so that the extrusion molding die 51 moves relative to only the upper portion of the peripheral edge of the windshield 2, the windshield unit 1 as shown in FIG. 2 will be produced. When the robot 30 moves the windshield 2 so that the extrusion molding die 51 moves relative to the upper portion and the side portions of the peripheral edge of the windshield 2, the windshield unit 1 as shown in FIG. 3 will be produced. When the robot 30 moves the windshield 2 so that the extrusion molding die 51 moves relative to the upper portion, the side portions and the lower portion of the peripheral edge of the windshield 2, the windshield unit 1 as shown in FIG. 4 will be produced. As described above, a spacer molding 20a optionally may be inserted into gap G formed in the windshield unit 1 shown in FIG. 4, if desired. Further, the spacer molding 20a may be separately formed or may be in situ formed. Further, the spacer molding 20a may have a cross section that is substantially identical with the molding 20 or may have a different cross-section.

According to these representative methods, when the extrusion molding die 51 moves with respect to the periphery of windshield 2, the first contacting surface 52b of the groove 52 will contact and move along the cover tape 10 disposed on the windshield 2. However, the first contacting surface 52b will not directly contact the windshield outer surface 2a. As a result, when the extrusion molding die 51 and the windshield 2 are moved relative to each other, the windshield 2 is effectively prevented from being scratched, and the extrusion molding die 51 is effectively prevented from excessively wearing.

Further, because the width W1 of the groove 52 is preferably slightly greater than the combined thickness of the windshield 2, the cover tape 10 and the frit layer 6, the second contacting surface 52c of the groove 52 will not substantially contact (or will only loosely or lightly contact) the frit layer 6 disposed on the windshield 2. Therefore, the windshield 2 and the frit layer 6 will not be damaged by the second contacting surface 52c of the extrusion molding die 51. Naturally, the second contacting surface 52c of the extrusion molding die 51 will not be excessively worn, even if the extrusion molding die 51 is made from a relatively soft material.

As shown in FIG. 9, the trimmer 60 can accurately trim the cover tape 10 attached to the first surface 2a of the windshield 2 along the peripheral edge 8a of the outer chamfered portion 8. Thus, the trimmer 60 can be utilized to remove the unnecessary portion 10a Therefore, it is not necessary to carefully attach the cover tape 10 to the windshield first surface 2a, so that the periphery of the cover tape 10 accurately extends along the outer peripheral edge 8a of the chamfered portion 8. As a result, the cover tape 10 can be easily and quickly attached to the windshield 2.

Because the cover tape 10 accurately extends along the peripheral edge 8a of the windshield outer chamfered portion 8, the peripheral edge 25 of the molding side wall portion 22 can be reliably aligned with the peripheral edge 8a of the windshield outer chamfered portion 8 by simply removing the cover tape 10 from the windshield 2.

As shown by a broken line in FIG. 12, a flash 25a may be produced by leakage of the extrusion molding material from the molding space 52a and may extend from the peripheral edge 25 of the molding side wall portion 22. Because the flash 25a will reliably adhere to the cover tape 10 due to the adhesive layer 15, such a flash 25a can be easily removed together with the cover tape 10 by simply stripping away the cover tape 10. For example, the peripheral edge of the cover tape 10 may function as a cutting device. Therefore, additional time-consuming work is not necessary in order to remove the flash 25a. Thus, the peripheral edge 25 of the side wall portion 22 of the molding 20 will have a straight, attractive appearance.

In addition, the adhesive layer 15 disposed on the cover tape 10 can be completely removed from the first surface 2a of the windshield 2 by simply peeling or stripping away the cover tape 10. As a result, additional time-consuming work is not necessary in order to remove the adhesive layer 15 from the windshield first surface 2a. Moreover, if the cover tape 10 has a width of several centimeters, the adhesive layer 15 can be easily disposed only on the cover tape 10 and without extending past the cover tape 10.

As described above, the cover tape 10 is preferably a relatively thin tape and, e.g., may have a thickness of about 0.03 to 0.1 mm. Therefore, when the cover tape 10 is removed from the windshield 2, the peripheral edge 25 of the molding side wall portion 22 will be substantially aligned with the peripheral edge of the first surface 2a of the windshield 2. As a result, the windshield unit 1 will have an attractive appearance. It should be noted that the distance between the peripheral edge 25 and the windshield first surface 2a has been exaggerated in FIGS. 1 and 13 for purpose of illustration.

Various changes and modifications may be made to the first representative embodiment without departing from the scope of the present teachings. For example, although the cover tape 10 was applied to only the first surface 2a of the windshield 2, the cover tape 10 also can be applied to the frit layer 6 on the second surface 2b of the windshield 2. In such case, the robot 30 may be driven to continuously move the windshield 2 in such a manner that the extrusion molding die 51 will move along the periphery of windshield 2 while the second contacting surface 52c of the groove 52 contacts the cover tape 10 that is provided on the second surface 2b of the windshield 2. Also, the cover tape 10 can be applied to both the first and second surfaces 2a, 2b of the windshield 2, if desired.

Second Detailed Representative Embodiment

A second detailed representative embodiment will now described with reference to FIGS. 14 to 18. Because the second embodiment relates to the first embodiment, only constructions and elements that are different from the first embodiment will be explained in detail. Elements that are the same in the first and second embodiments will be identified by the same reference numerals and detailed description of such elements will be omitted.

Figure 18:
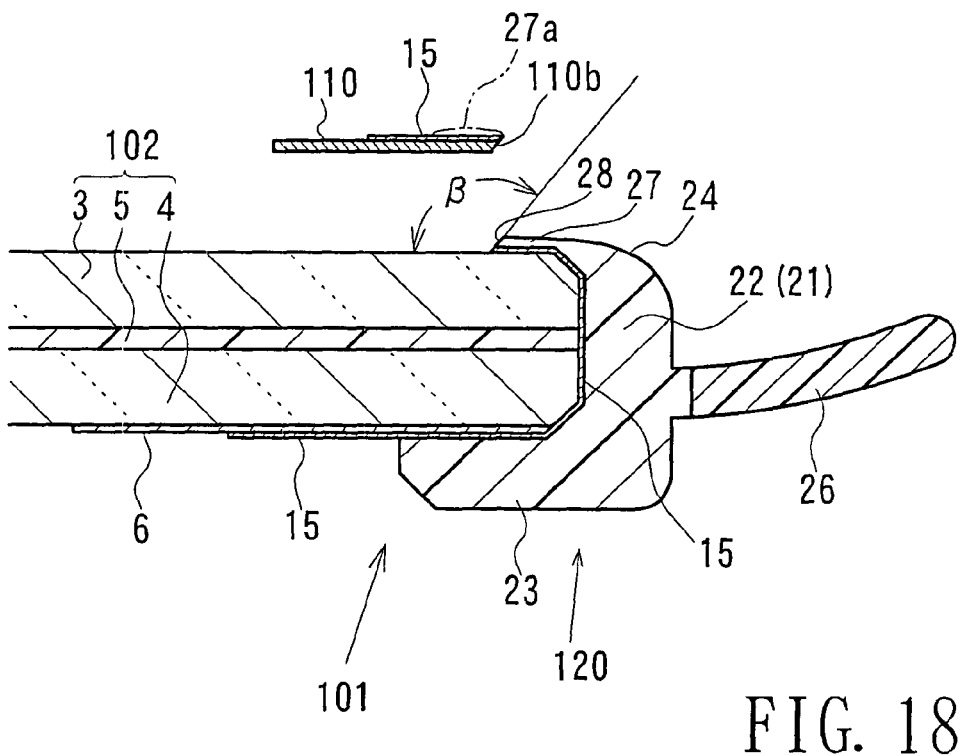
FIG. 18 is a partial cross-sectional view of a windshield unit that is formed by removing the cover tape.

Similar to the first embodiment, windshield unit 101 may comprise a windshield 102 and a molding 120, as shown in FIG. 18. Windshield 102 may have the same construction as windshield 2. Further, the molding 120 may be substantially identical to the molding 20 with the exception of the following difference. For example, the side wall portion 22 of the molding 120 may include a thin extension 27 that extends onto the windshield first surface 2a (FIG. 18). In other words, unlike the first embodiment the molding 120 may partially cover a portion of the first surface 2a, as well as the end surface 7 and a portion of the second surface 2b, of the windshield 102.

Figure 14:
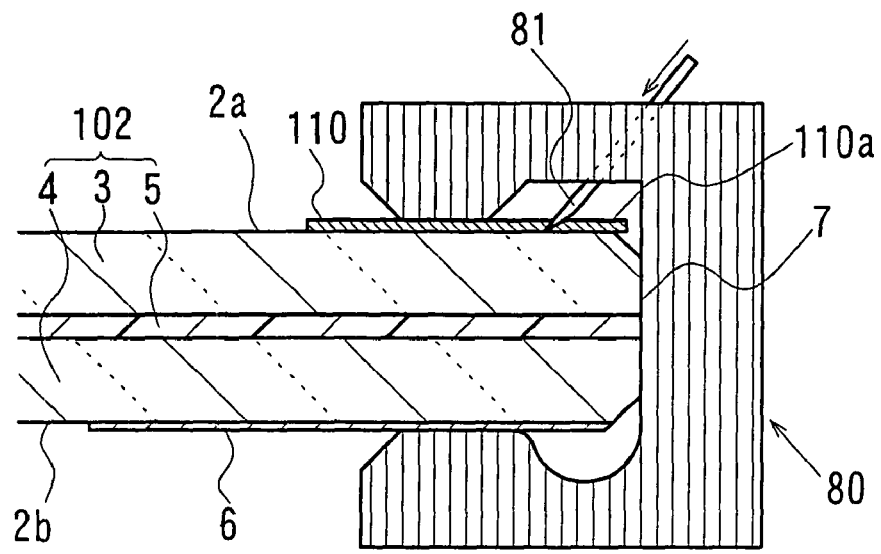
FIG. 14 is a partial cross-sectional view of a cover tape applied to windshield and illustrating the cover tape being cut, which embodiment corresponds to a second representative embodiment of the present teachings.

A representative method for manufacturing a windshield unit 101 according to the second embodiment will now be described. As shown in FIG. 14, a cover tape 110 having a suitable width (e.g., several centimeters) may be applied to the first surface 2a of the windshield 102. In this embodiment, unlike the first embodiment, the cover tape 110 can be arranged or disposed on the windshield first surface 2a so that its longitudinal edge does not project over the periphery of the windshield 102. Further, although cover tape 110 may have substantially the same construction as the cover tape 10 of the first embodiment, cover tape 110 may preferably be thicker (e.g. about 0.3 to 1.0 mm). For example, the thickness of the cover tape 110 may be several times the thickness of the cover tape 10.

The cover tape 110 is then cut along the periphery of the windshield 102, in order to remove unnecessary portion 110a Unlike the first embodiment, as shown in FIG. 14, the cover tape 110 is preferably cut along a predetermined cutting line (not shown) on the windshield first surface 2a Therefore, an uncovered or exposed portion S will be formed on the windshield first surface 2a when the unnecessary portion 110a is removed and the exposed portion S will extend along a portion of the periphery of the windshield 102. Because the cutting line is positioned at a certain distance from the peripheral edge of the windshield first surface 2a, the exposed portion S extends over a certain width from the peripheral edge of the windshield first surface 2a.

As shown in FIG. 14, a U-shaped cutting tool 80 having a retractable cutting blade 81 may be utilized to cut the cover tape 110. This cutting tool 80 may include a panel engagement groove that is adapted to receive the periphery of the windshield 102. Naturally, the cutting tool 80 may be moved along the periphery of the windshield 102 with the cutting blade 81 contacting the windshield first surface 2a, to thereby cut the cover tape 110.

Figure 15:
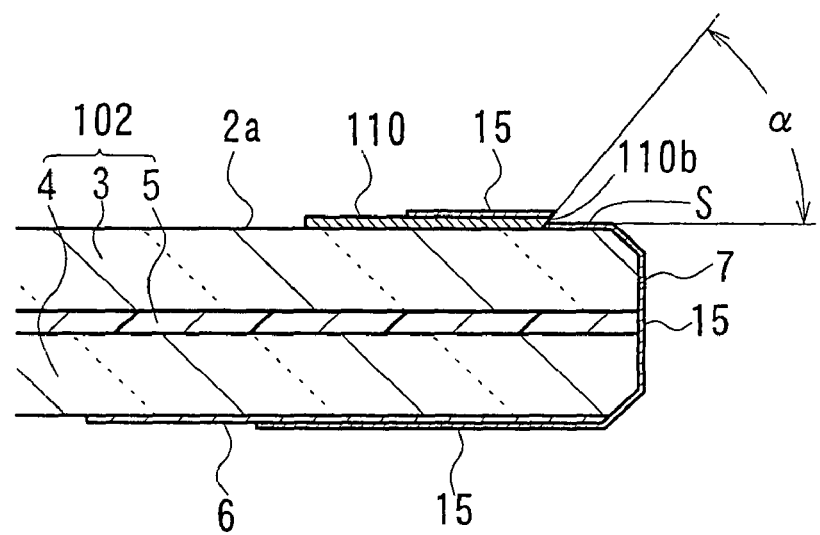
FIG. 15 is a partial cross-sectional view of the windshield of FIG. 14 after an unnecessary portion of the cover tape has been removed and an adhesive layer has been applied thereto.

The cover tape 110 optionally may be obliquely cut, so as to form an oblique cutting surface 110b. As shown in FIG. 15, the cutting surface 110b cooperates with the windshield first surface 2a to form a wedge-shaped groove therebetween. In other words, the cutting surface 110b is inclined at an acute angle $\alpha$ with respect to the windshield first surface 2a. Subsequently, as shown in FIG. 15, the adhesive layer 15 may be applied to the periphery of the windshield 2, so as to substantially continuously cover a portion of the cover tape 110 on the windshield first surface 2a, the uncovered portion S, the windshield end surface 7 and a portion of the frit layer 6 on the windshield second surface 2b.

Figure 16:
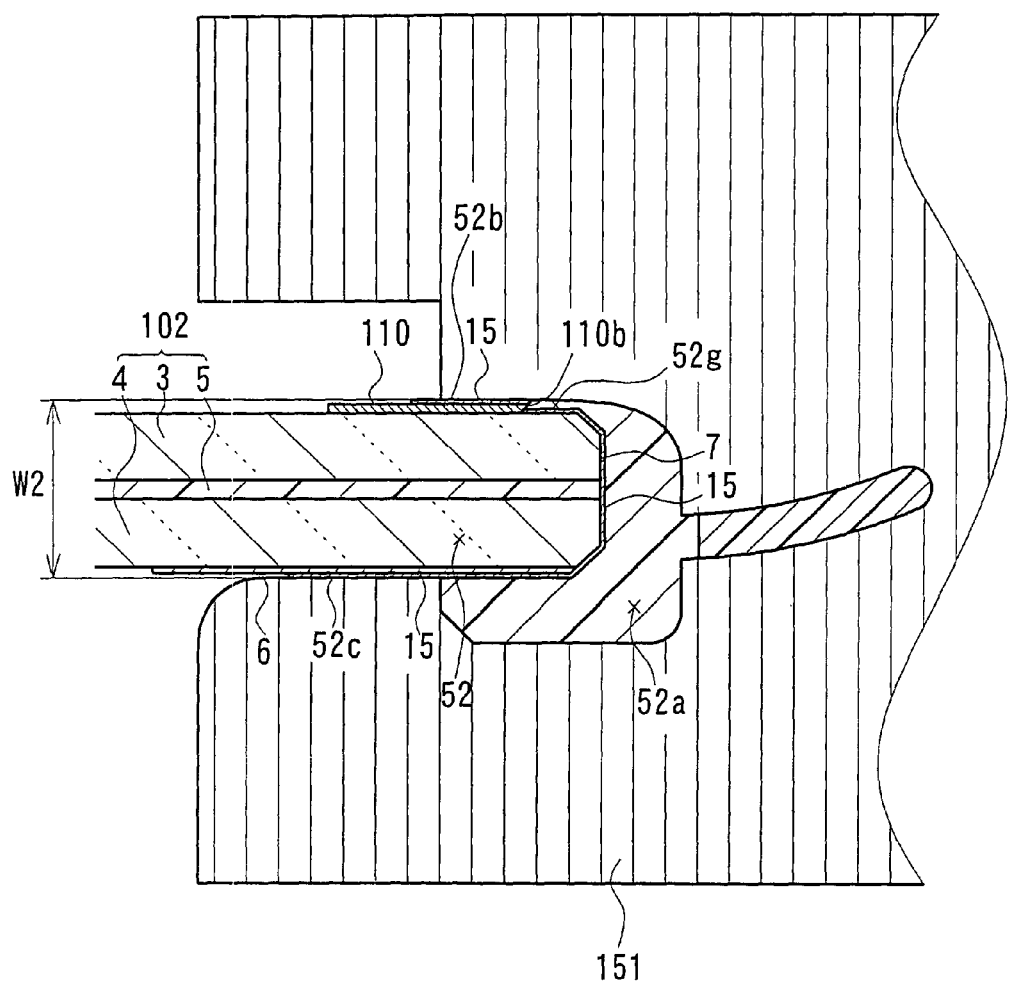
FIG. 16 is a cross-sectional view of an extrusion molding die during formation of a molding on the periphery of the windshield.

An extrusion molding apparatus may be used to manufacture the windshield unit 101 that is similar to the representative apparatus of the first embodiment. However, as shown in FIG. 16, the size of groove 52 may be modified in the extrusion molding die 151 of the second representative embodiment. For example, the groove 52 may have a width W2 that is greater than the width W1 of the extrusion molding die 51. Therefore extrusion molding die 151 will be capable of receiving the windshield 102, which includes a relatively thicker cover tape 110. Further, the groove 52 may be designed in such a way that an additional molding space 52g is formed between the first contacting surface 52b and the uncovered portion S, when the windshield 102 is inserted into or engaged with the panel receiving space 52 of the extrusion molding die 151. The additional molding space 52g preferably continuously extends from the molding space 52a.

Figure 17:
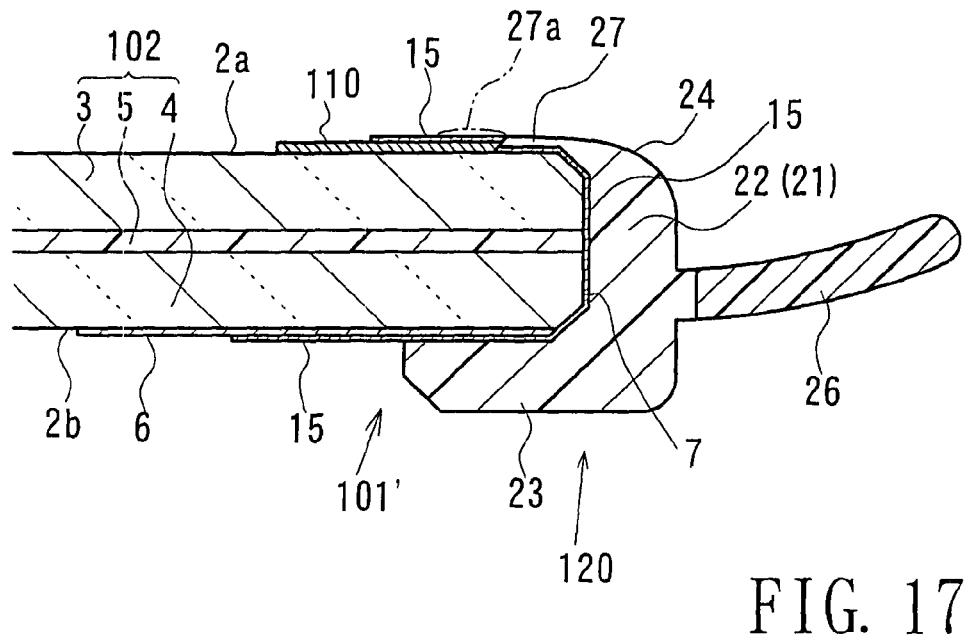
FIG. 17 is a partial cross-sectional view of an intermediate windshield unit in which the cover tape has not yet been removed.

Similar to the first embodiment, the molding 120 is continuously formed on and bonded to the periphery of the windshield 102, to thereby form an intermediate windshield unit 101', as shown in FIG. 17. However, the molding 120 of intermediate windshield unit 101' includes the thin extension 27 that extends from the molding side wall portion 22 onto the first surface 2a. As will be easily recognized, extension 27 is formed by the additional molding space 52g that is defined between the first contacting surface 52b of the groove 52 of the extrusion molding die 51 and the uncovered portion S of the windshield first surface 2a when the windshield 102 is inserted into or engaged with the panel receiving space 52.

Thereafter, the cover tape 110 is removed from the windshield 102 of the intermediate windshield unit 101', to thereby form the windshield unit 101, as shown in FIG. 18. As described above, because the cover tape 110 includes the oblique cutting surface 110b, it can be easily removed from the windshield 120.

In the windshield unit 101 thus formed, the extension 27 of the molding 120 has an inclined end surface 28 that corresponds to the oblique cutting surface 110b of the cover tape 110. This inclined end surface 28 is inclined at an obtuse angle $\beta$ with respect to the windshield first surface 2a (FIG. 18), because the cutting surface 110b is inclined at an acute angle $\alpha$ with respect to the windshield first surface 2a. Therefore, the possibility that the extension 27 may catch on a surrounding part is minimized. As a result, the extension 27 may be effectively prevented from unexpectedly separating from the windshield first surface 2a, and will provide an attractive appearance. Furthermore, as shown by a broken line in FIGS. 17 and 18, any flash 27a that extends from the extension 27 can be easily removed by simply stripping away (removing) the cover tape 110.

Third Detailed Representative Embodiment

The third detailed representative embodiment will now described with reference to FIGS. 19 to 24. Because the third embodiment relates to the first embodiment, only constructions and elements that are different from the first embodiment will be explained in detail. Elements that are the same in the first and third embodiments will be identified by the same reference numerals and detailed description of such elements will be omitted.

Figure 24:
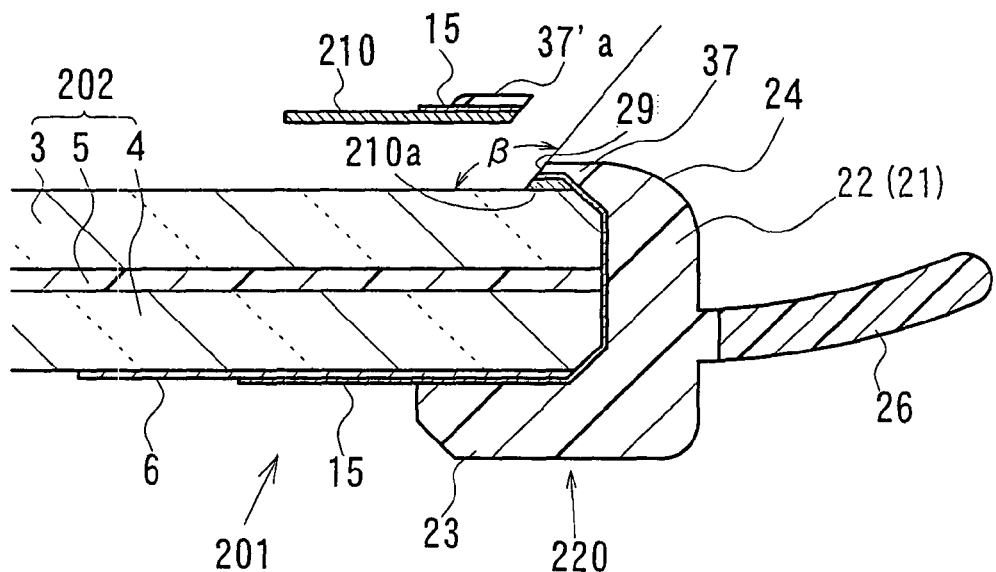
FIG. 24 is a partial cross-sectional view of a windshield unit formed by removing the cover tape.

Similar to the first embodiment, a windshield unit 201 may comprise a windshield 202 and a molding 220. The windshield 202 may have substantially the same construction as the windshield 2. Moreover, the molding 220 may be substantially identical to the molding 20 with the following exception. Specifically, the molding 220 may differ from the molding 20 in that an extension 37 extends from the side wall portion 22 of the molding 220 onto the windshield first surface 2a (FIG. 24). In other words, unlike the first embodiment, the molding 220 partially covers the first surface 2a, as well as the end surface 7 and the second surface 2b, of the windshield 202.

Figure 19:
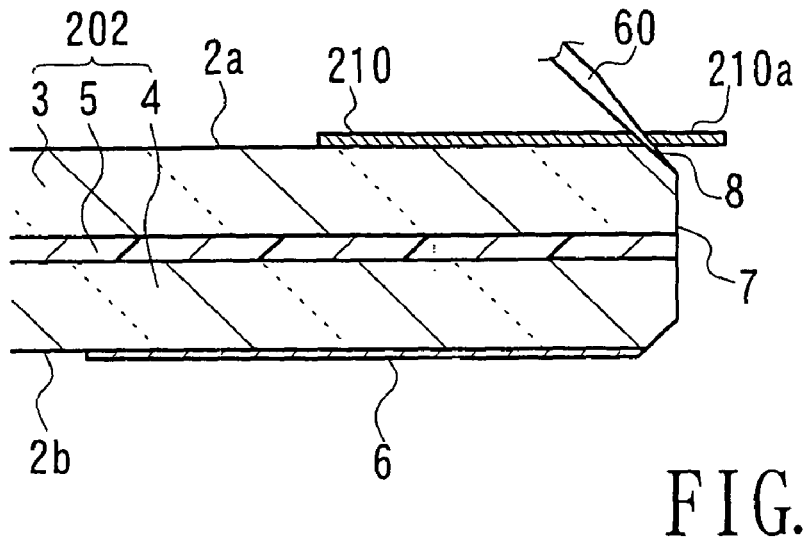
FIG. 19 is a partial cross-sectional view of a cover tape applied to windshield and illustrating the cover tape being cut, which embodiment corresponds to a third representative embodiment of the present teachings.
Figure 20:
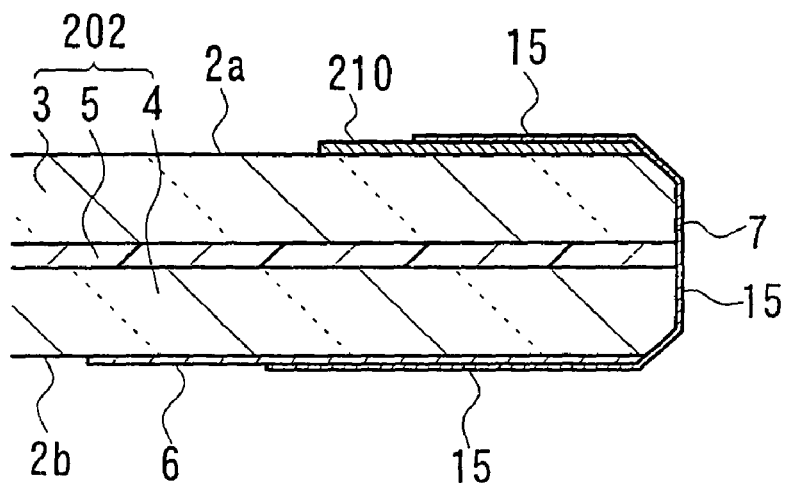
FIG. 20 is a partial cross-sectional view of the windshield of FIG. 19 after an unnecessary portion of the cover tape has been removed and an adhesive layer has been applied thereto.

A representative method for manufacturing the windshield unit 201 will now be described. As shown in FIG. 19, similar to the first embodiment, a cover tape 210 may be applied to the first surface 2a of the windshield 202 and the cover tape 210 may have substantially the same construction as the cover tapes 10, 110 used in the first and second embodiments. Similar to the first embodiment, the cover tape 210 is then trimmed or cut along the periphery of the windshield 202, in order to remove an unnecessary portion 210a. Subsequently, similar to the first embodiment, the adhesive layer 15 may be applied to the periphery of the windshield 2 (FIG. 20).

Figure 21:
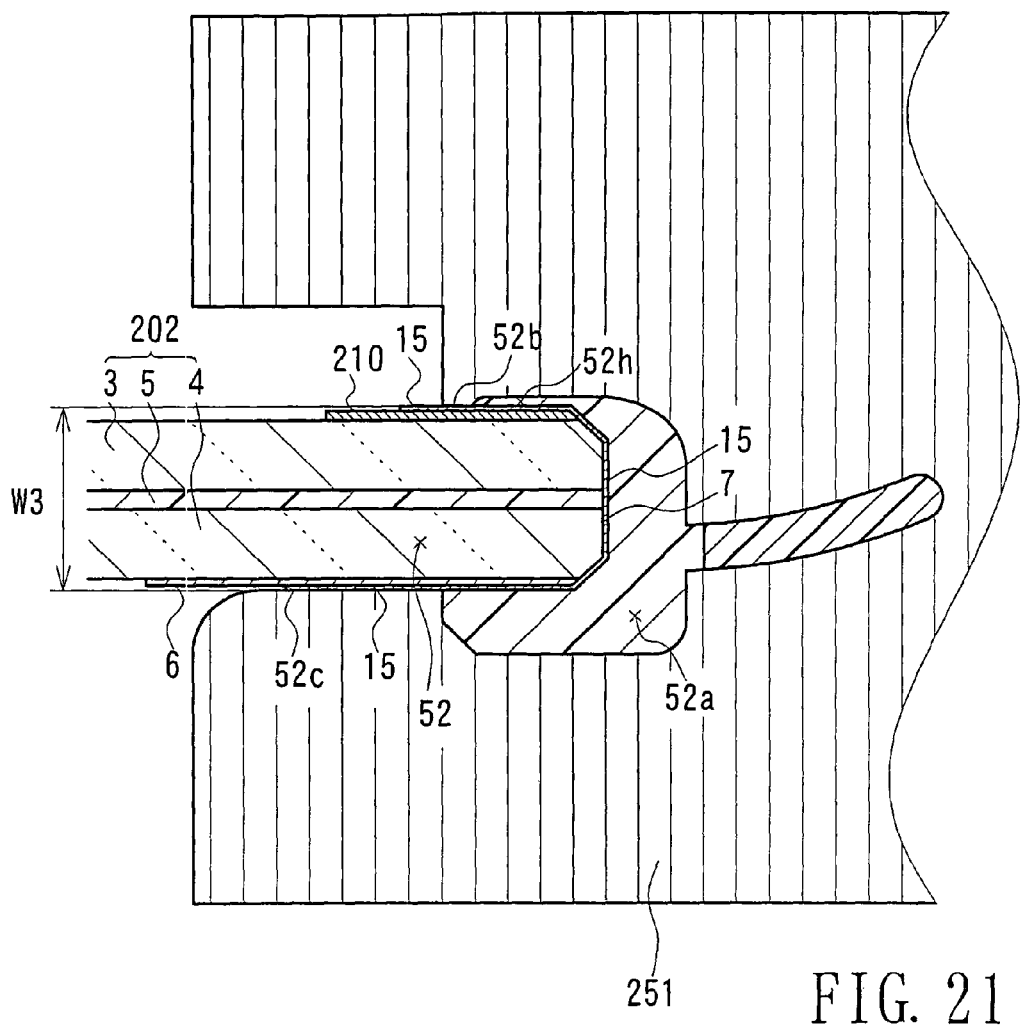
FIG. 21 is a sectional view of an extrusion molding die during formation of a molding on the periphery of the windshield.

The windshield unit 201 may be manufactured by utilizing an extrusion molding apparatus that is similar to the apparatus described with respect to the first embodiment. An appropriate apparatus may include an extrusion molding die 251 having a groove 52 that is modified in size and shape. That is, the groove 52 of the extrusion molding die 251 has a desired width W3 for receiving the windshield 202 having the cover tape 210 disposed thereon. Further, as shown in FIG. 21, the first contacting surface 52b of the groove 52 is partially shaped or engraved, so that an additional molding space 52h continuously extends from the molding space 52a and is defined between the first contacting surface 52b and the cover tape 210 attached to the windshield first surface 2a when the windshield 202 is inserted into the panel receiving space 52 of the extrusion molding die 251.

Figure 22:
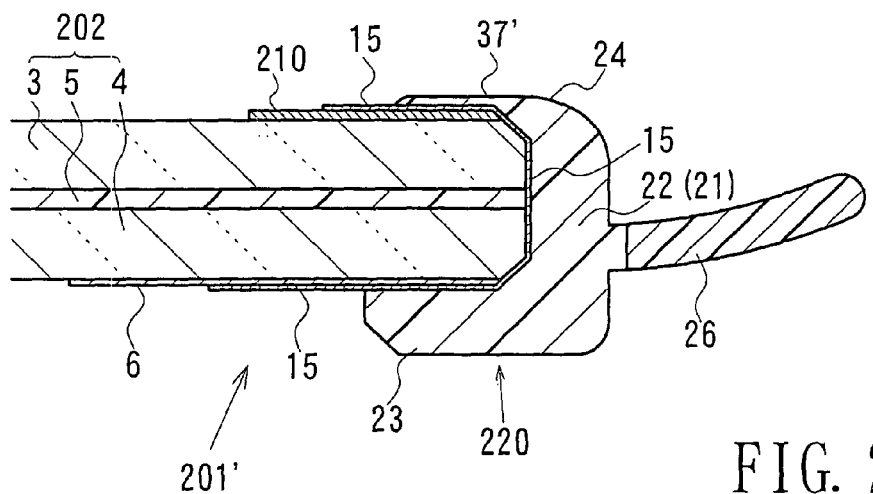
FIG. 22 is a partial cross-sectional view of an intermediate windshield unit in which the cover tape has not been removed.

Similar to the first embodiment, the molding 220 is continuously formed on and bonded to the periphery of the windshield 202, to thereby form an intermediate windshield unit 201' (FIG. 22). In this intermediate windshield unit 201', the molding 220 includes a covering portion 37' that extends from the molding side wall portion 22 onto the cover tape 210 provided on the windshield first surface 2a. This covering portion 37' is formed by the additional molding space 52h that is defined between the first contacting surface 52b of the groove 52 of the extrusion molding die 251 and the cover tape 210 attached to the windshield first surface 2a. As will be appreciated, in this embodiment, the covering portion 37' is bonded to the cover tape 210 and not to windshield first surface 2a. In other words, the covering portion 37' is attached to the windshield first surface 2a and the cover tape 210 is interleaved between the covering portion 37' and the windshield first surface 2a. Thereafter, the covering portion 37' and the cover tape 210 may be cut along a predetermined cutting line (not shown) that extends along the periphery of the windshield 2.

Figure 23:
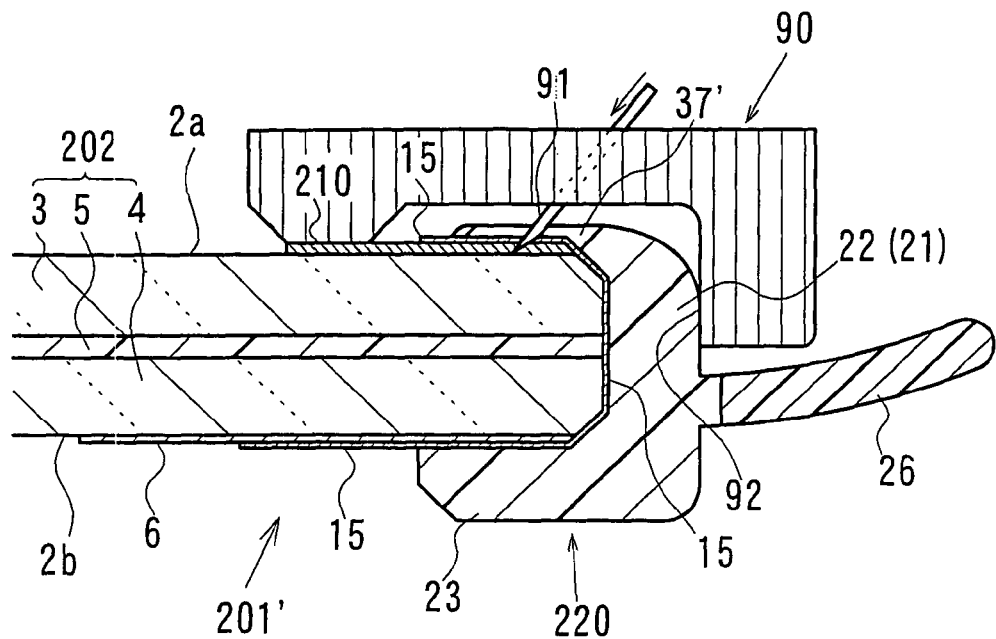
FIG. 23 is a partial cross-sectional view of the intermediate windshield unit and illustrating the cover tape being cut.

Preferably, as shown in FIG. 23, the covering portion 37' and the cover tape 210 are cut with a L-shaped cutting tool 90 that has a retractable cutting blade 91. This cutting tool 90 has a contacting surface 92 that is adapted to contact the molding 220, so as to appropriately position the cutting blade 91 on the windshield first surface 2a. As will be appreciated, the cutting tool 90 is moved along the periphery of the windshield 202 with the cutting blade 91 projecting toward the windshield first surface 2a, to thereby cut the covering portion 37' and the cover tape 210 along the cutting line.

Thereafter, the cover tape 210 is removed from the windshield 202 of the intermediate windshield unit 201', to thereby form the windshield unit 201 (FIG. 24). In this embodiment, when the cut cover tape 210 is removed, a cut strip 37'a of the covering portion 37' is also removed at the same time. Therefore, the molding 220 of the windshield unit 201 includes the extension 37 that partially covers the windshield first surface 2a. As will be appreciated, in the windshield unit 201, a cut portion 210a of the cover tape 210 is left on the windshield 202 and the cut portion 210a is interleaved between the extension 37 and the windshield first surface 2a.

The covering portion 37' and the cover tape 210 may be obliquely cut, so as to form an oblique cutting surface 29 on the extension 37 when the cover tape 210 is removed from the windshield 202 with the cut strip 37'a. As will be recognized, the covering portion 37' and the cover tape 210 may be obliquely cut in such away that the cutting surface 29 is inclined at an obtuse angle β with respect to the windshield first surface 2a (FIG. 24). Therefore, the possibility that the extension 37 may catch on a surrounding part is minimized. As a result, the extension 37 may be effectively prevented from unexpectedly separating from the windshield first surface 2a, and may have an attractive appearance.

Furthermore, although in the above preferred embodiments, the molding body covers the lower and end surfaces or all of the upper, lower and end surfaces of the periphery of the windshield, the construction of the molding body is not limited to the representative embodiments. For example, the molding body preferably may be modified to cover only the upper, lower or end surface of the periphery of the windshield.

Although moldings for a laminated glass windshield were exemplified in the above representative embodiments, the panels and the molded articles of the present teachings are not limited as such. For instance, the panel may be a single tempered glass windshield or a resin windshield. Further, the panel may be a resin or metal panel. In addition, the molded article may be a gasket, a packing or an ornamental frame.

Additional examples of related methods for manufacturing panel units are found in the assignee's prior U.S. Pat. Nos. 5,411,696, 5,445,780 and 5,558,828, the teachings of which are incorporated herein by reference in their entirety and may be advantageously utilized with the present teachings. For example, according to U.S. Pat. No. 5,411,696, the panel may be moved along a predetermined orbital path with respect to the extrusion die, whereby the molding will always have the some outer dimension, regardless of whether the panel size varies. Further, the panel may be tilted with respect to the extrusion die, so that the molding will always extend at the same angle from a curved panel.

What is claimed is:

1. A method for manufacturing a panel unit comprising:

circumferentially chamfering a panel along a periphery thereof to form a chamfered portion having a peripheral edge and an end surface, applying a synthetic resin removable cover tape having a predetermined width to a first surface of the panel so as to substantially extend along a periphery of the panel, the removable cover tape being applied such that a lateral part of the removable cover tape projects over the peripheral edge of the chamfered portion, continuously cutting the removable cover tape along the peripheral edge of the chamfered portion of the panel, and trimming the removable cover tape along a cutting line which is positioned on an end surface side of the panel in a widthwise direction of the removable cover tape, then, forming an adhesive layer on the periphery of the panel, the adhesive layer being formed so as to overlap at least a lateral portion of the trimmed removable cover tape on the first surface, the chamfered portion, the end surface and a second surface of the panel, relatively moving an extrusion molding die with respect to the panel on which the adhesive layer has been formed so that the molding die selectively moves along the removable cover tape applied to the panel while contacting the removable cover tape but not directly contacting the surface of the panel, simultaneously extruding a molten molding material from the extrusion molding die, thereby integrally forming a molded article along the periphery of the panel, the formed molded article adhering to the periphery of the panel via the adhesive layer, such that a peripheral edge of the molded article corresponds to the cutting line of the removable cover tape, wherein the removable cover tape has heat resistance sufficient to be prevented from melting when the heated extrusion molding die contacts the cover tape, extending a part of the molten molding material onto the overlapped adhesive layer so as to extend in a widthwise direction when the molten molding material is extruded, thereby forming a flash that is adhered to the removable cover tape via the overlapped adhesive layer, wherein the molten molding material is extruded at least on the end surface, the chamfered portion and the second surface so that the molded article is bonded to the end surface, the chamfered portion and the second surface via the adhesive layer, and removing all of the cut and trimmed removable cover tape from the first surface of the panel by peeling, without cutting, the removable cover tape after the molded article is formed, and removing thereby the flash and the adhesive layer on the cover tape with the peeled removable cover tape, such that the removable cover tape is not interleaved between the molded article and the surface of the panel and the peripheral edge of the molded article is bonded to the periphery of the panel via the adhesive layer, and the peripheral edge of the molded article aligns with the peripheral edge of the chamfered portion and is substantially flush with the first surface of the panel.

2. A method as defined in claim 1, wherein the panel is a window pane for a vehicle.

3. A method as defined in claim 2, wherein the window pane comprises a laminated glass having a joining sheet.

4. A method as defined in claim 2, wherein the molded article has an article body and a lip outwardly extending therefrom, wherein the extruding step of the molten molding material comprises extruding a first material and a second material having an elasticity greater than the first material from the extrusion molding die so that the article body formed from the first material and the lip formed from the second material can be integrally formed.

5. A method as in claim 1, wherein the removable cover tape has a thickness of about 0.03 to 1.0 mm and comprises a first layer comprising a synthetic resin and a second layer comprising a removable self-adhesive material.

6. A method as defined in claim 1, wherein the step of relatively moving an extrusion molding die and the panel comprises moving the molding die with respect to the panel.

7. A method as defined in claim 1, wherein the step of relatively moving an extrusion molding die and the panel comprises moving the panel with respect to the molding die.

8. A method as defined in claim 1, wherein the step of relatively moving an extrusion molding die and the panel comprises moving both the molding die and the panel with respect to each other.

* * * * *